United States Patent
Narula et al.

(10) Patent No.: US 12,225,080 B2
(45) Date of Patent: Feb. 11, 2025

(54) ADAPTIVE SCHEDULER FOR COLLABORATION NETWORKING

(71) Applicant: Dell Products, L.P., Round Rock, TX (US)

(72) Inventors: Harpreet Narula, Austin, TX (US); Danilo O. Tan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/329,716

(22) Filed: Jun. 6, 2023

(65) Prior Publication Data

US 2024/0414226 A1 Dec. 12, 2024

(51) Int. Cl.
| | |
|---|---|
| *H04L 67/104* | (2022.01) |
| *H04L 61/2575* | (2022.01) |
| *H04L 67/1061* | (2022.01) |
| *H04W 8/00* | (2009.01) |
| *H04W 76/14* | (2018.01) |

(52) U.S. Cl.
CPC ...... *H04L 67/1055* (2013.01); *H04L 61/2575* (2013.01); *H04L 67/1061* (2013.01); *H04W 8/005* (2013.01); *H04W 76/14* (2018.02)

(58) Field of Classification Search
CPC ... H04L 61/2575; H04L 9/14; H04L 67/1061; H04L 41/0806
See application file for complete search history.

(56) References Cited

U.S. PATENT DOCUMENTS

| | | | | |
|---|---|---|---|---|
| 11,100,197 | B1 * | 8/2021 | Bernardi | H04L 9/14 |
| 2008/0288580 | A1 * | 11/2008 | Wang | H04L 61/2575 |
| | | | | 709/203 |
| 2012/0134349 | A1 * | 5/2012 | Jung | H04W 8/005 |
| | | | | 370/338 |
| 2013/0084914 | A1 * | 4/2013 | Wu | H04M 1/72412 |
| | | | | 455/525 |
| 2015/0172905 | A1 * | 6/2015 | Qi | H04L 67/1061 |
| | | | | 370/338 |
| 2015/0256385 | A1 * | 9/2015 | Chandhok | H04L 41/0806 |
| | | | | 715/734 |
| 2023/0199872 | A1 * | 6/2023 | Mysore | H04W 8/005 |
| | | | | 455/41.2 |

OTHER PUBLICATIONS

Daniel Camps-Mur, et al., "Device-To-Device Communications with Wifi Direct: Overview and Experimentation," IEEE Wireless Communications, Jun. 2013, pp. 96-104, IEEE.

\* cited by examiner

*Primary Examiner* — Barbara B Anyan
(74) *Attorney, Agent, or Firm* — Fogarty LLP

(57) ABSTRACT

Systems and methods for an adaptive scheduler for collaboration networking are described. In an illustrative, non-limiting embodiment, a first Information Handling System (IHS) may include: a processor; and a memory coupled to the processor, wherein the memory comprises program instructions store thereon that, upon execution by the processor, cause the first IHS to: establish a peer-to-peer (P2P) connection with a second IHS; and adapt a scan rate and an advertisement rate of the first IHS based, at least in part, on context of the P2P connection. If the first IHS is configured as a host for the P2P connection, then it can adapt an advertisement rate of the first IHS, and stop any scans by the first IHS. If the first IHS is configured as a client for the P2P connection, it can adapt a scan rate of the first IHS, and stop any advertisements by the first IHS.

18 Claims, 8 Drawing Sheets

710

| ADAPTIVE SCAN CONFIG | ADVT RATE | SCAN RATE | SLEEP DURATION |
|---|---|---|---|
| DEFAULT | HOST: 11<br>CLIENT: 4 | HOST: 5<br>CLIENT: 5 | HOST: 1<br>CLIENT: 3 |
| OFF | HOST: 0<br>CLIENT: 0 | HOST: 0<br>CLIENT: 0 | HOST: 17<br>CLIENT: 12 |
| OPTIMIZED | HOST: 7<br>CLIENT: 0 | HOST: 0<br>CLIENT: 5 | HOST: 10<br>CLIENT: 7 |

FIG. 7A

ADAPTIVE SCHEDULER FOR COLLABORATION NETWORKING

FIELD

This disclosure relates generally to Information Handling Systems (IHSs), and more specifically, to systems and methods for an adaptive scheduler for collaboration networking.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Peer-to-peer ("P2P") computing or networking is a distributed application architecture that partitions tasks or workloads between peers. Peers are equally privileged, equipotent participants in the network. They are said to form a peer-to-peer network of nodes. Peers make a portion of their resources, such as processing power, disk storage or network bandwidth, directly available to other network participants, without the need for central coordination by servers or stable hosts. Peers are both suppliers and consumers of resources, in contrast to the traditional client-server model in which the consumption and supply of resources are divided.

A peer-to-peer network is designed around the notion of equal peer nodes simultaneously functioning as both "clients" and "servers" to the other nodes on the network. This model of network arrangement differs from the client-server model where communication is usually to and from a central server. A typical example of a file transfer that uses the client-server model is the File Transfer Protocol ("FTP") service in which the client and server programs are distinct: the clients initiate the transfer, and the servers satisfy these requests.

Peer-to-peer networks generally implement some form of virtual overlay network on top of the physical network topology, where the nodes in the overlay form a subset of the nodes in the physical network. Data is still exchanged directly over the underlying TCP/IP network, but at the application layer peers are able to communicate with each other directly, via the logical overlay links (each of which corresponds to a path through the underlying physical network). Overlays are used for indexing and peer discovery, and make the P2P system independent from the physical network topology. Based on how the nodes are linked to each other within the overlay network, and how resources are indexed and located, we can classify networks as unstructured or structured (or as a hybrid between the two).

SUMMARY

Systems and methods for an adaptive scheduler for collaboration networking are described. In an illustrative, non-limiting embodiment, an Information Handling System (IHS) may include: a processor; and a memory coupled to the processor, wherein the memory comprises program instructions store thereon that, upon execution by the processor, cause the first IHS to: establish a peer-to-peer (P2P) connection with a second IHS; and adapt a scan rate and an advertisement rate of the first IHS based, at least in part, on context of the P2P connection.

In some embodiments, the context of the P2P connection comprises throughput needs of an application that communicates via the P2P connection. In some embodiments, the context of the P2P connection comprises one or more environmental conditions. In some embodiments, the one or more environmental conditions comprise an overall available time for communication between the first IHS and the second IHS via the P2P connection. In some embodiments, the one or more environmental conditions comprise a channel bandwidth of the P2P connection. In some embodiments, the one or more environmental conditions comprise an amount of resources allocated to either the first IHS or the second IHS by parameters of the P2P connection. In some embodiments, the P2P connection comprises a Wi-Fi Direct connection.

In some embodiments, to adapt the scan rate and the advertisement rate of the first IHS, the program instructions, upon execution by the processor, further cause the first IHS to: determine that the first IHS is configured as a host for the P2P connection; adapt an advertisement rate of the first IHS; and stop any scans by the first IHS for other P2P connections. In other embodiments, to adapt the scan rate and the advertisement rate of the first IHS, the program instructions, upon execution by the processor, further cause the first IHS to: determine that the first IHS is configured as a client for the P2P connection; adapt a scan rate of the first IHS; and stop any advertisements by the first IHS for other P2P connections.

In some embodiments, the P2P connection is established via a wireless communication medium. In some of these embodiments, the program instructions, upon execution by the processor, further cause the first IHS to: determine a channel utilization of the wireless communication medium; and select a channel of the wireless communication medium based, at least in part, on the determined channel utilization.

In some embodiments, the first IHS is configured as a host for the P2P connection, and the program instructions, upon execution by the processor, further cause the first IHS to: provide a client scan rate to the second IHS. In some of these embodiments, the program instructions, upon execution by the processor, further cause the first IHS to: provide a synchronization timestamp to the second IHS.

In some embodiments, the program instructions, upon execution by the processor, further cause the first IHS to: determine that a number of P2P connected devices has reached a threshold; and based at least in part on the determination, stop any scans and advertisements.

In another illustrative, non-limiting embodiment, one or more non-transitory computer-readable storage media storing program instructions, that when executed on or across one or more processors of a first Information Handling System (IHS), cause the first IHS to: establish a peer-to-peer (P2P) connection with a second IHS; and adapt a scan rate and an advertisement rate of the first IHS based, at least in part, on context of the P2P connection.

In some embodiments, in order to adapt the scan rate and the advertisement rate of the first IHS, the program instructions further cause the first IHS to: determine that the first IHS is configured as a host for the P2P connection; adapt an advertisement rate of the first IHS; and stop any scans by the first IHS for other P2P connections. In some embodiments, the P2P connection is established via a wireless communication medium, and the program instructions further cause the first IHS to: determine a channel utilization of the wireless communication medium; and select a channel of the wireless communication medium based, at least in part, on the determined channel utilization. In some embodiments, the program instructions further cause the first IHS to: determine that a number of P2P connected devices has reached a threshold; and based at least in part on the determination, stop any scans and advertisements.

In another illustrative, non-limiting embodiment, a method comprises: establishing, by a first Information Handling System (IHS), a peer-to-peer (P2P) connection with a second IHS, wherein the first IHS is configured as a host of the P2P connection; and adapting a scan rate and an advertisement rate of the first IHS based, at least in part, on context of the P2P connection.

In some embodiments, adapting the scan rate and the advertisement rate of the first IHS further comprises: adapting an advertisement rate of the P2P connection for the first IHS; and stopping any scans by the first IHS for other P2P connections. In some embodiments the method further includes determining that a number of P2P connected devices has reached a threshold; and based at least in part on the determination, stopping scanning and advertising for other P2P connections.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 7A is a chart depicting test results of an advertisement rate, scan rate, and sleep duration for a default adaptive scan configuration, no adaptive scanning, and an optimized adaptive scan configuration, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
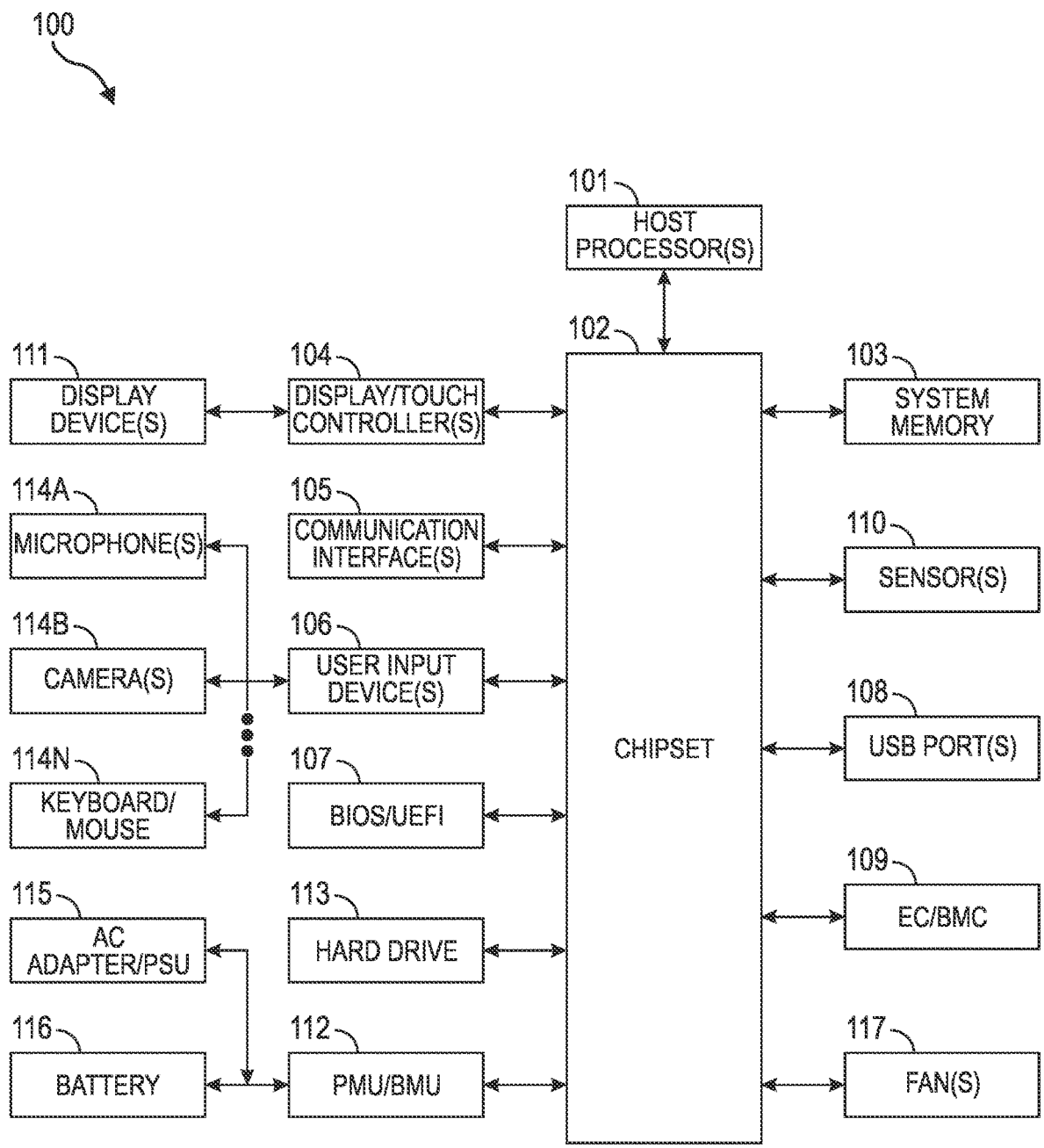
FIG. 1 is a diagram illustrating examples of hardware components of an Information Handling System (IHS), according to some embodiments.

FIG. 1 is a block diagram of hardware components of IHS 100, which may be used to implement an adaptive scheduler for collaboration networking.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
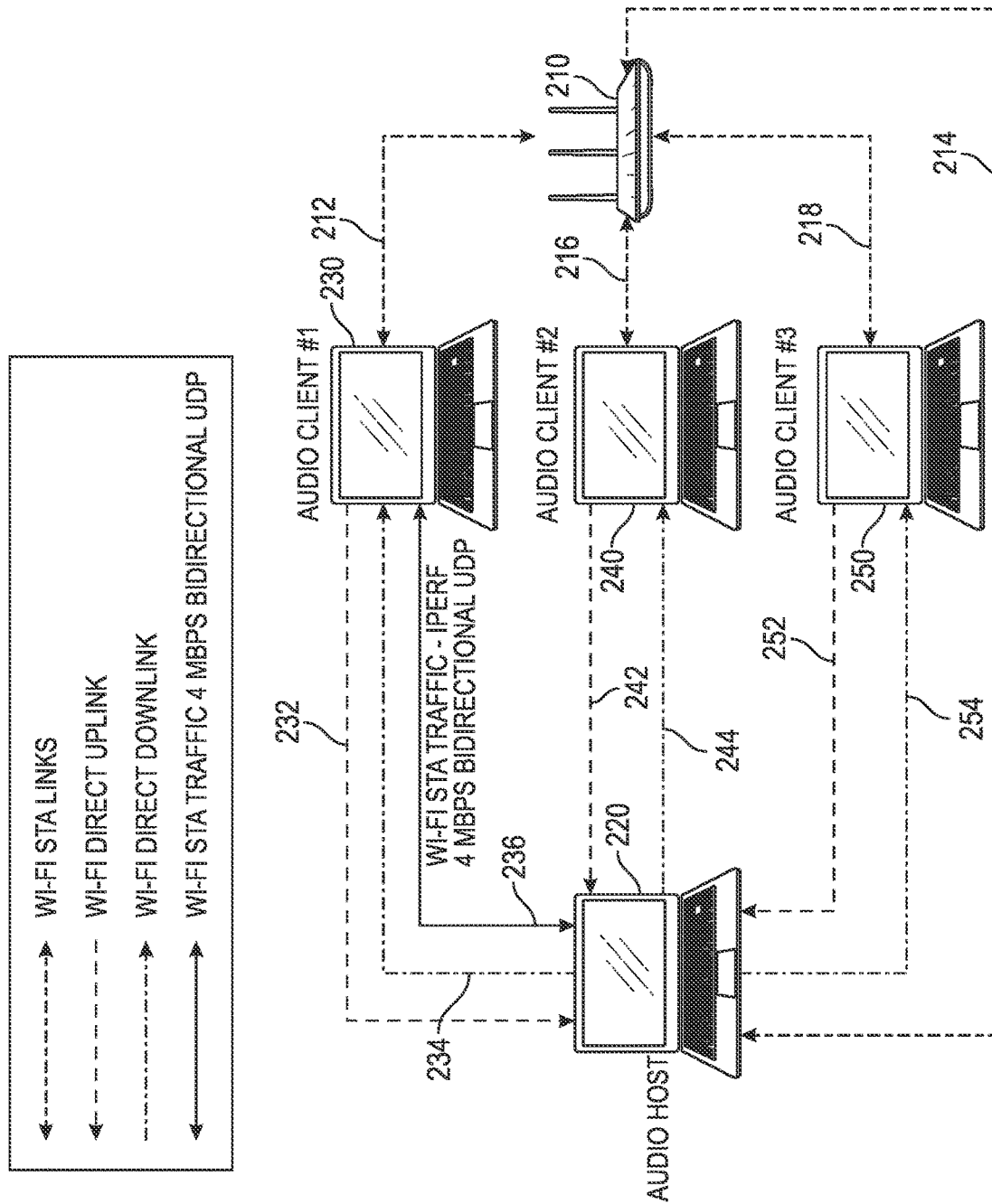
FIG. 2 is a diagram illustrating a first use case for an adaptive scheduler for collaboration networking, according to some embodiments.

FIG. 2 is a diagram illustrating a first use case of an adaptive scheduler for collaboration networking, according to some embodiments. This first use case enhances a small collaboration room experience by leveraging microphone inputs from multiple client devices while an audio host acts as aggregator of voice from all microphones in the room. This first use case can be called "Audio Fusion" in some embodiments. In FIG. 2, an Audio Host 220 is connected to 3 Audio Client devices (230, 240, 250). Each of the Client devices (230, 240, 250) can now use its own microphone to capture voice, and use its own speakers to playback audio, so each user can hear the conference voice without the need for conference equipment.

Each of the devices is connected to the Wi-Fi access point or station 210 using a conventional Wi-Fi connection. The audio host 220 is connected to the Wi-Fi access point or station 210 through conventional Wi-Fi connection 214. Likewise, audio client #1, audio client #2, and audio client #3 are connected to the Wi-Fi access point or station 210 through conventional Wi-Fi connections 212, 216, and 218, respectively.

Conventional Wi-Fi networks are typically based on the presence of controller devices known as wireless access points or stations. These devices normally combine three primary functions: (a) Physical support for wireless and wired networking; (b) Bridging and routing between devices on the network; and/or (c) Service provisioning to add and remove devices from the network. A typical Wi-Fi home network includes laptops, tablets and phones, devices like modern printers, music devices, and televisions. Most Wi-Fi networks are set up in infrastructure mode, where the access point acts as a central hub to which Wi-Fi capable devices are connected. All communication between devices goes through the access point in these networks.

However, in addition to the conventional Wi-Fi connections to the Wi-Fi access point or station 210, the audio host 220 is connected to each of the audio client devices (230, 240, 250) through separate Wi-Fi direct uplinks and downlinks, according to some embodiments. Wi-Fi Direct (formerly known as Wi-Fi Peer-to-Peer) is a Wi-Fi standard for peer-to-peer wireless connections that allows two devices to establish a direct Wi-Fi connection without an intermediary wireless access point, router, or Internet connection. Wi-Fi Direct is single-hop communication, rather than multi-hop communication like wireless ad hoc networks. Instead of leveraging the ad-hoc mode of operation, Wi-Fi Direct can build upon the successful IEEE 802.11 infrastructure mode and lets devices negotiate who will take over the AP-like functionalities, in some embodiments. Thus, legacy Wi-Fi devices can seamlessly connect to Wi-Fi Direct device, in some embodiments.

Wi-Fi Direct can be a way of communicating wirelessly, much like Bluetooth. It can be useful for everything from internet browsing to file transfer, and to communicate with one or more devices simultaneously at typical Wi-Fi speeds. One advantage of Wi-Fi Direct, in some embodiments, is the ability to connect devices even if they are from different manufacturers. In some embodiments, only one of the Wi-Fi devices needs to be compliant with Wi-Fi Direct to establish a peer-to-peer connection that transfers data directly between them with greatly reduced setup. Wi-Fi Direct can negotiate the link with a Wi-Fi Protected Setup system, in some embodiments, that assigns each device a limited wireless access point. The "pairing" of Wi-Fi Direct devices can be set up to require the proximity of a near field communication, a Bluetooth signal, or a button press on one or all the devices, depending on the embodiment.

In contrast to conventional Wi-Fi communication, Wi-Fi Direct devices can communicate with each other without requiring a dedicated wireless access point, in some embodiments. The Wi-Fi Direct devices can negotiate when they first connect to determine which device shall act as a host device. These roles are specified as dynamic, and hence a Wi-Fi Direct device has to implement both the role of a client and the role of a host (sometimes referred to as Soft-AP), in some embodiments. These roles are therefore logical roles that could even be executed simultaneously by the same device, for instance by time-sharing the channel through virtualization techniques. In order to establish a communication, then, the Wi-Fi devices have to agree on the role that each device will assume.

Wi-Fi Direct devices can communicate by establishing Groups, which can be functionally equivalent to traditional Wi-Fi infrastructure networks. The device implementing AP-like functionality in the Group can be referred to as the Group Host, and devices acting as clients can be known as Clients. Given that these roles are not static, when two P2P devices discover each other they negotiate their roles to establish a Group. Once the Group is established, other Clients can join the group as in a traditional Wi-Fi network.

Therefore, devices have first to discover each other, and then can negotiate which device will act as the host, in some embodiments. Wi-Fi Direct devices can usually start by performing a traditional Wi-Fi scan (active or passive), by means of which they can discover existent Groups and Wi-Fi networks. After this scan, a discovery algorithm can be executed. First, a device can select one of the so-called social channels, such as channels 1, 6, or 11 in the 2.4 GHZ band, as its listen channel, in some embodiments. Then, it can alternate between two states: an advertisement state, in which the device performs active sending of Probe Requests in each of the social channels; and a scan state, in which the device listens for Probe Requests in its listen channel to respond with Probe Responses.

Once the two P2P Devices have found each other, they can start the negotiation phase. This can be implemented using a three-way handshake, namely a negotiation Request/ Response/Confirmation, whereby the two devices agree on which device will act as a Host and on the channel where the group will operate, in some embodiments. The channel an be in the 2.4 GHz or 5 GHZ bands, in some embodiments. Once the devices have discovered each other and agreed on the respective roles, the next phase is the establishment of a secure communication using Wi-Fi Protected Setup, which can be denoted as WPS Provisioning phase. Finally, a DHCP exchange to set up the IP configuration can occur.

Referring back to FIG. 2, the audio host 220 is connected to audio client #1 230 through Wi-Fi direct uplink 232, and Wi-Fi direct downlink 234. The audio host 220 is connected to audio client #2 240 through Wi-Fi direct uplink 242, and Wi-Fi direct downlink 244. The audio host 220 is connected to audio client #3 250 through Wi-Fi direct uplink 252, and Wi-Fi direct downlink 254. These uplinks (232, 242, 252) and downlinks (234, 244, 254) can be on the same Wi-Fi channel or a different Wi-Fi channel as the access point or station links (212, 214, 216, 218). In addition, each individual uplink (232, 242, 252) or downlink (234, 244, 254) might be on a same or different Wi-Fi channel as another uplink or downlink.

In some embodiments, the audio host 220 might be connected to a particular audio client device 230 through an iPerf 4 Mbps bi-directional UDP Wi-Fi station channel 236. iPerf can be a tool for network performance measurement and tuning. It can be a cross-platform tool that can produce standardized performance measurements for any network, in some embodiments. iPerf has client and server functionality, and can create data streams to measure the throughput between the two ends in one or both directions. Typical iPerf output contains a time-stamped report of the amount of data transferred and the throughput measured. The data streams can be either Transmission Control Protocol ("TCP") or User Datagram Protocol ("UDP"). When used for testing UDP capacity, iPerf allows the user to specify the datagram size and provides results for the datagram throughput and the packet loss.

Figure 3:
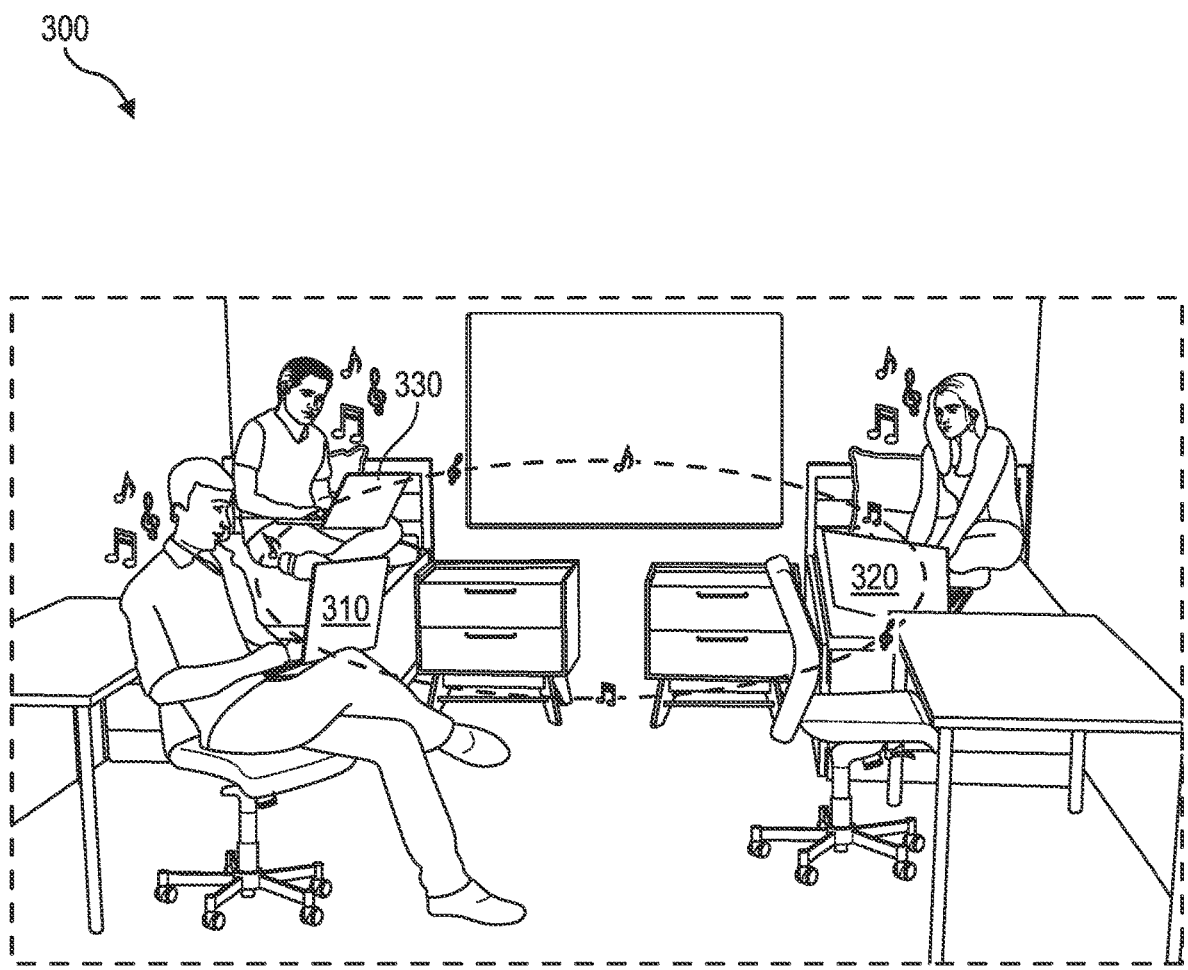
FIG. 3 is a diagram illustrating a second use case for an adaptive scheduler for collaboration networking, according to some embodiments.

FIG. 3 is a diagram illustrating a second use case of an adaptive scheduler for collaboration networking, according to some embodiments. This second use case can combine speakers from individual devices (such as laptops 310, 320, 330) to work together as one, transforming individual device's (310, 320, 330) limited speakers to an immersive shared audio experience, such that users can enjoy music in synchronization with their family or friends. This second use case can be called "Music Synchrony" in some embodiments.

Multiple latency sensitive collaboration and/or shared use cases like Audio Fusion and Music Synchrony can be implemented using collaboration networking, such as peer-to-peer ("P2P") internetworking, in some embodiments, while also needing to maintain Internet traffic (e.g., through the conventional Wi-Fi connection to the station or access point). Solutions to maintain P2P internetworking along with Internet traffic can be implemented using Dual-Radio solutions like Dual Band Simultaneous (DBS) or Double Connect using Gfp4. However, unfortunately, dual-radio solutions are currently not adopted on most commercial and consumer platforms. However, collaboration and/or shared use cases still need to be enabled, even without the use of a dual-radio. Therefore, a solution is required to manage multiple time sensitive links using a single radio, where dual-radio is unavailable.

Therefore, some embodiments of the present disclosure provide an adaptive scheduler which can be adapted to the application and environmental conditions to improve latency for time-sensitive collaboration networking (such as P2P) applications. Some embodiments provide a contextual adaptive scheduler for Wi-Fi traffic management. Some of these embodiments can provide intelligent optimizations in connectivity based on key features, profiles, and usage models (e.g., contextual, security manageability, and/or traffic).

Figure 4:
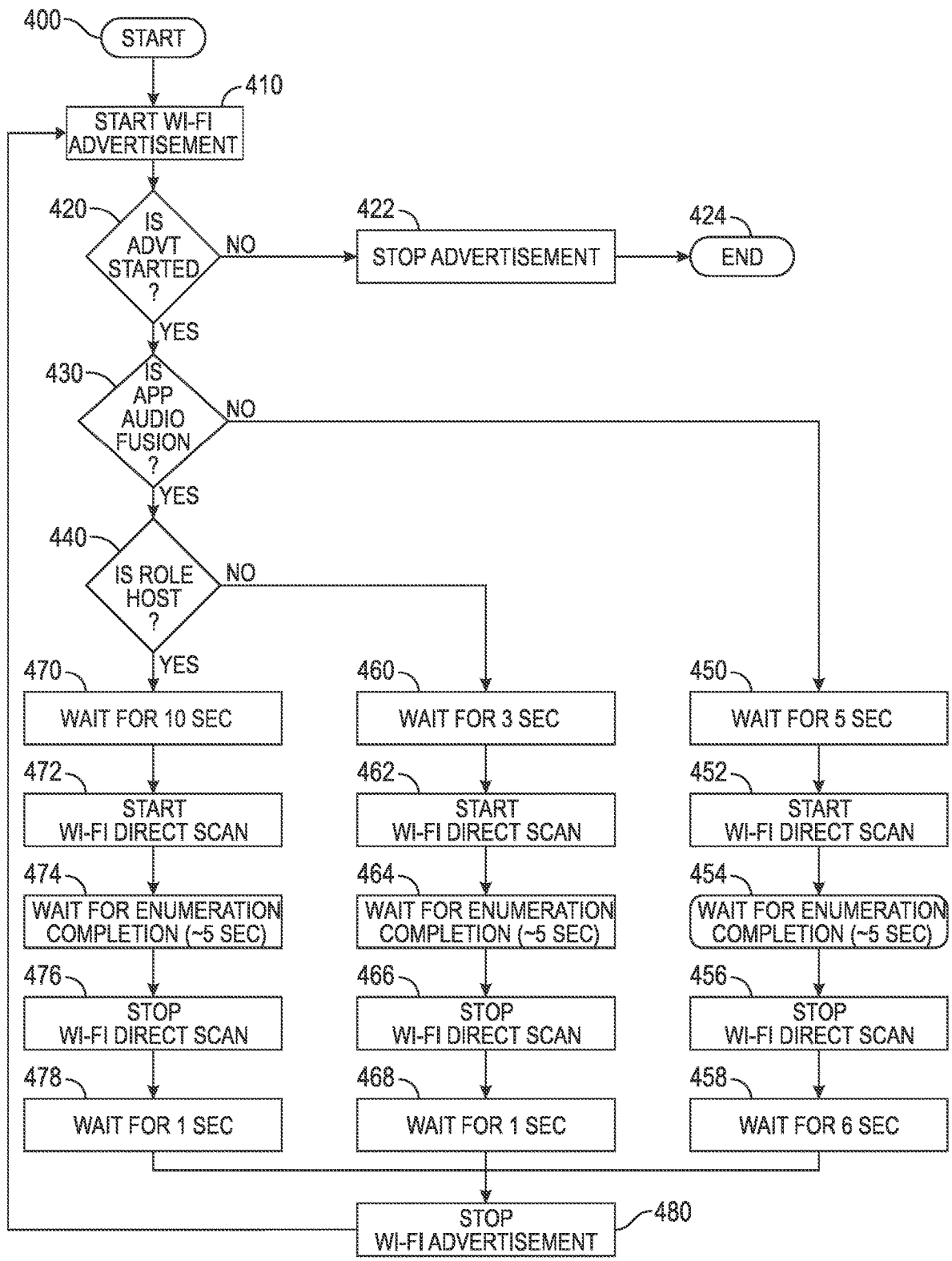
FIG. 4 is a functional flowchart illustrating default advertising and scanning of host and client devices for collaboration networking, without any optimizations enacted, according to some embodiments.

FIG. 4 is a functional flowchart illustrating default advertising and scanning (e.g., Wi-Fi Direct advertising and scanning) of host and client devices for collaboration networking, without any optimizations enacted, according to some embodiments. In some embodiments, system 400 may be instantiated, at least in part, through the execution of program instructions stored in system memory 103 and executed by host processor(s) 101 of IHS 100.

As one can see by going through the flowchart, FIG. 4 results in an Audio Fusion host (e.g., Wi-Fi Direct host) advertising for 11 seconds, scanning for 5 seconds and doing nothing for 0 seconds. FIG. 4 results in an Audio Fusion client (e.g., a Wi-Fi Direct client) advertising for 4 seconds, scanning for 5 seconds, and doing nothing for 0 seconds. FIG. 4 results in other applications advertising for 11 seconds, scanning for 5 seconds and doing nothing for 0 seconds. In essence, FIG. 5 results in each of the options always doing something related to Wi-Fi advertisement or scanning.

More specifically, FIG. 4 begins at the start block 400. At 410 Wi-Fi direct advertisement is started. The flowchart then transitions to block 420 which determines whether the Wi-Fi advertisement has started or not. If the Wi-Fi advertisement has not started, then an error or malfunction of some kind has occurred. Therefore, the flowchart transitions to block 422 where the Wi-Fi advertisement is stopped and then to block 424 where the flowchart ends.

If, however, the Wi-Fi advertisement has started, as determined by block 420, then the flowchart transitions to block 430 which determines whether the application is an "Audio Fusion" application or not. If the application is not an "Audio Fusion" application the flowchart transitions to the series of blocks 450-458.

First, at block 450, the flowchart waits for 5 seconds. Since the Wi-Fi advertisement has already started at block 410, this means that the device performs a Wi-Fi advertisement for the 5 seconds. Then at block 452, the flowchart starts a Wi-Fi Direct scan. The flowchart transitions to block 454 where it waits for enumeration completion, which can normally take around 5 seconds. The flowchart transitions to block 456 which stops Wi-Fi direct scan. The flowchart then transitions to block 458 where it waits for 6 seconds. During these 6 seconds the device is continuing its Wi-Fi advertisement functionality that was started in block 410. After the 6 seconds, the flowchart transitions to block 480 where the Wi-Fi advertisement is stopped. After block 480, the flowchart returns back to block 410 where the cycle repeats with the start of the Wi-Fi advertisement again. Therefore, FIG. 4 results in other applications advertising for 11 seconds, scanning for 5 seconds and doing nothing for 0 seconds.

Returning back to block 430, if the application is an "Audio Fusion" application, then the flowchart transitions to block 440 where it determines if the role is the Host or not. If the role is not the host, and instead a client, then the flowchart transitions to the series of blocks 460-468.

First, at block 460, the flowchart waits for 3 seconds. Since the Wi-Fi advertisement has already started at block 410, this means that the device performs a Wi-Fi advertisement for the 3 seconds. Then at block 462, the flowchart starts a Wi-Fi Direct scan. The flowchart transitions to block 464 where it waits for enumeration completion, which can normally take around 5 seconds. The flowchart transitions to block 466 which stops Wi-Fi direct scan. The flowchart then transitions to block 468 where it waits for 1 second. During this 1 second the device is continuing its Wi-Fi advertisement functionality that was started in block 410. After the 1 second, the flowchart transitions to block 480 where the Wi-Fi advertisement is stopped. After block 480, the flowchart returns back to block 410 where the cycle repeats with the start of the Wi-Fi advertisement again. FIG. 4 results in an Audio Fusion client (e.g., a Wi-Fi Direct client) advertising for 4 seconds, scanning for 5 seconds, and doing nothing for 0 seconds.

Returning back to block 430, if the application is an "Audio Fusion" application, then the flowchart transitions to block 440 where it determines if the role is the Host or not. If the role is the host, then the flowchart transitions to the series of blocks 470-478.

First, at block 470, the flowchart waits for 10 seconds. Since the Wi-Fi advertisement has already started at block 410, this means that the device performs a Wi-Fi advertisement for the 10 seconds. Then at block 472, the flowchart starts a Wi-Fi Direct scan. The flowchart transitions to block 474 where it waits for enumeration completion, which can normally take around 5 seconds. The flowchart transitions to block 476 which stops Wi-Fi direct scan. The flowchart then transitions to block 478 where it waits for 1 second. During this 1 second the device is continuing its Wi-Fi advertisement functionality that was started in block 410. After the 1 second, the flowchart transitions to block 480 where the Wi-Fi advertisement is stopped. After block 480, the flowchart returns back to block 410 where the cycle repeats with the start of the Wi-Fi advertisement again. FIG. 4 results in an Audio Fusion host (e.g., Wi-Fi Direct host) advertising for 11 seconds, scanning for 5 seconds and doing nothing for 0 seconds.

Figure 5:
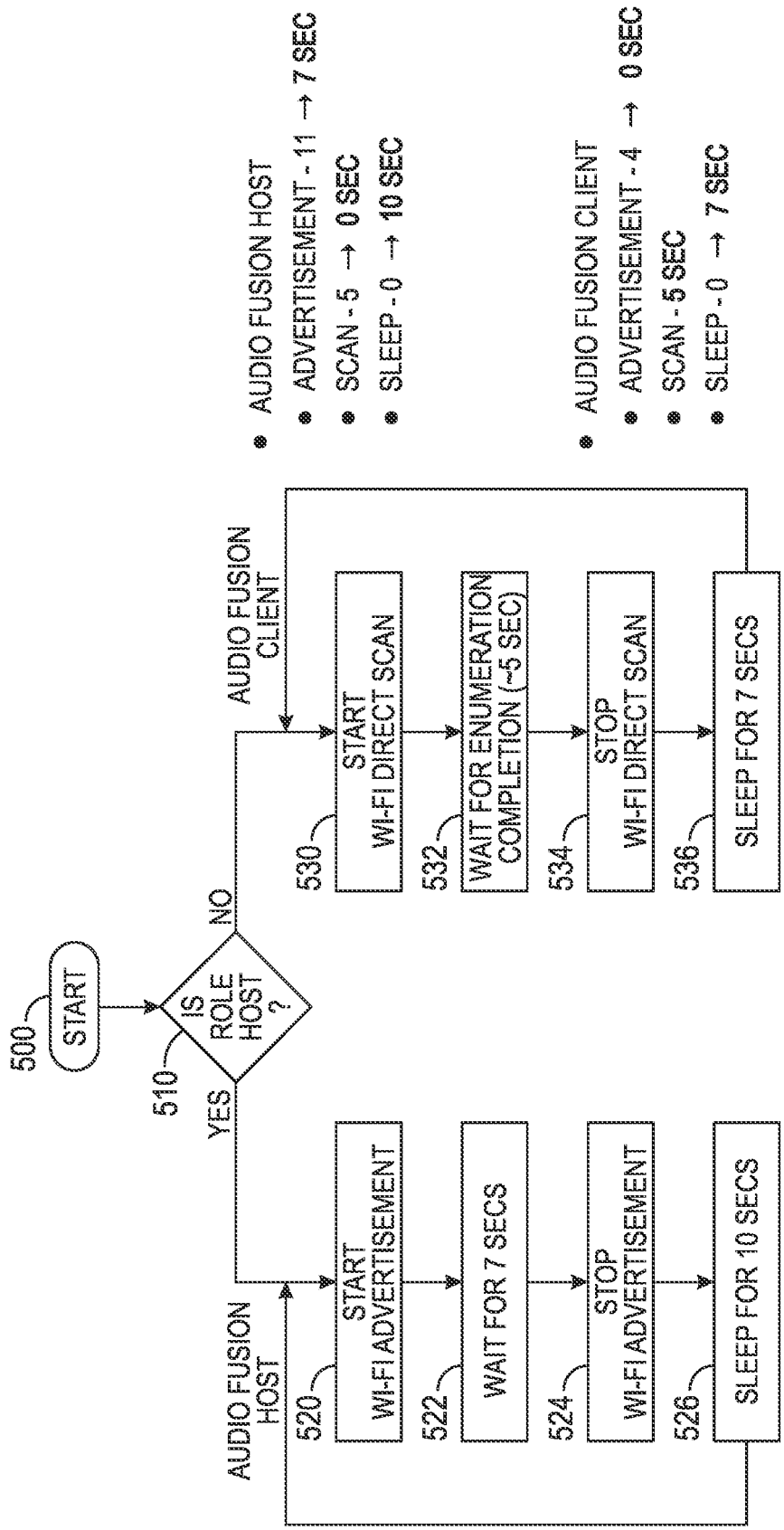
FIG. 5 is a functional flowchart illustrating an example of a method for contextual adaptive scheduling for collaboration networking with optimizations enacted, according to some embodiments.

FIG. 5 is a functional flowchart illustrating an example of a method for contextual adaptive scheduling for collaboration networking with optimizations enacted, according to some embodiments. In some embodiments, system 500 may be instantiated, at least in part, through the execution of program instructions stored in system memory 103 and executed by host processor(s) 101 of IHS 100.

Contextual adaptive scheduling for Wi-Fi traffic management can encompass application adaptation, query/response rate adaptation, and/or channel adaptation, depending on the embodiment. Application Adaptation, in some embodiments, allows hosts to only advertise and allows clients to only scan for Wi-Fi Direct discovery. Most collaboration applications (e.g. Audio Fusion) are configured for the Host/Client model, where the Host device is responsible to establish the setup of the collaboration room. An IHS device configured as a Host device can be configured to only advertise for the other devices in the collaboration room, and doesn't necessarily need to scan, in some embodiments. IHS devices which would be client devices can be configured to scan only, and don't necessarily need to Advertise for P2P traffic, in some embodiments.

In addition, in some embodiments, both advertising and scanning can be turned off when certain conditions have been met, so as not to interfere with P2P data traffic or with general Internet traffic through the conventional Wi-Fi connection. As explained further below, an off adaptive scan configuration allows for better performance and packet latency, proving an effective means to control packet latency. For example, once a collaboration room has reached a maximum limit of connected devices, then advertising and scanning can be turned off. As another example, once a threshold of connected devices has been reached, then advertising and scanning can be turned off. As another example, once a predetermined number of connected devices has been reached, then advertising and scanning can be turned off.

A contextual adaptive scheduler for Wi-Fi traffic management can also encompass Query/Response rate adaptation, in some embodiments. Query/Response rate adaptation can adapt the Advertisement and Scan rate, respectively for the Host and Client devices, based on the application throughput needs and environmental conditions. In order to calculate a Scan/Advertisement rate, which is some embodiments might be an optimal scan/advertisement rate, the following can be used:

First, the max throughput needs for the application which is being used for collaboration can be determined. This can be pre-determined for the supported application, in some embodiments. Second, the resources (in bytes) allocated to a given station ("STA") and/or traffic identifier ("TID") can be determined, in some embodiments. In some embodiments this can be determined from common information/user information fields of a trigger frame. In some embodiments, the following formula can be used:

Allocated Bytes=Rate in (Bits/(Seconds*Hz))*Bandwidth in Hz*Time in Seconds/8

In the above formula the rate can be derived from the uplink ("UL") Modulation Coding Scheme ("MCS"), Dual Carrier Modulation ("DCM"), Guard Intervals ("GI") and/or Long Training Field ("LTF") Duration, in some embodiments. The Bandwidth can be determined from a Resource Unit ("RU") allocation. A RU can be a unit in OFDMA terminology used in 802.11 WLAN to denote a group of bandwidth subcarriers (tones) used in both DownLink ("DL") and UpLink ("UL") transmissions. With OFDMA, different transmit powers may be applied to different RUs. The RUs enables an Access Point ("AP") to allow WLAN stations to access it simultaneously and efficiently. The AP holds the RU allocation information for every peer Non-AP station associated with it. Finally, the time can be determined from the UL length, in some embodiments.

As a final step of calculating an advertisement and scan rate for Query/Response rate adaptation, the Scan/Advertisement/Sleep rate can be scaled as percentage of overall available time and channel bandwidth. In addition to performing the Query/Response rate adaptation as part of establishing a connection between a host and client, the Query/Response rate adaptation can also occur during runtime to allow for allocation of specific latency tuning while meeting user experience needs.

A contextual adaptive scheduler for Wi-Fi traffic management can also encompass channel adaptation, in some embodiments. A standard IHS framework of Wi-Fi drivers (e.g., Windows Driver Framework ("WDF")) can use the AP/STA channel for P2P traffic using Wi-Fi Direct. The channel is typically selected by the AP, but this selection doesn't include the impact of P2P traffic and its needs. Channel adaptation can determine a channel utilization using Wi-Fi signal analysis, in some embodiments. This might be built into a collaboration application, in some embodiments. Channel adaptation can be performed during the initial boot up process, in some embodiments, or triggered if packet error rate or Bit Error Rate is high during the application, in some embodiments. Channel selection can be performed for each location, where the location can be determined based on the Wi Fi network connection, in some embodiments. Once selected, a channel can be configured for the given session, in some embodiments. Configuration can be reapplied under a similar network and application context, in some embodiments.

Returning to FIG. 5, FIG. 5 depicts an example configuration of the Host and Client. Wi-Fi Direct Advertisement and/or Scan time can be configured based on the role of the Client Device for a given application (e.g., Audio Fusion). FIG. 5 depicts an optimization of the advertisement and scan duration for a host and client device. This optimization resulted in latency (target<50 ms) improvement for >10% packets (from >100 ms to <50 ms).

FIG. 5 begins at bock 500. Block 510 determines if the role of the device is a host or client. If the role is a host, then the flowchart transitions to blocks 520-526. If the role is a client, then the flowchart transitions to blocks 530-536.

If the role is a host, the flowchart transitions to block 520 which starts Wi-Fi advertisement. The flowchart then transitions to block 522 which waits for 7 seconds. Therefore, the host advertises for 7 seconds. The flowchart then transitions to block 524 which stops the Wi-Fi advertisement. Then the flowchart transitions to block 526 which sleeps for 10 seconds. After this set of actions are completed, the flowchart loops back to 520 to repeat the set of actions again.

If the role is a client, the flowchart transitions to block 530 which starts a Wi-Fi Direct scan. Then the flowchart transitions to block 532 which waits for enumeration completion. This usually takes around 5 seconds, in some embodiments. Then the flowchart transitions to block 534 which stops the Wi-Fi direct scan. The flowchart transitions to block 536 which sleeps for 7 seconds. After this set of actions are completed, the flowchart loops back to 530 to repeat the set of actions again.

Therefore, as shown in the embodiment of FIG. 5, an IHS device configured as a Host device can be configured to only advertise for the other devices in the collaboration room, and doesn't scan. Likewise, an IHS device configured as a client device can be configured to scan only, and doesn't advertise for P2P traffic.

In addition, as shown in FIG. 5, the scan/advertisement and sleep rate has been adapted to more optimal rates. For an Audio Fusion host, the time for advertising has dropped from 11 seconds to 7 seconds. The scan time for an Audio Fusion host has been cut from 5 seconds to 0 seconds. The sleep time has increased from 0 seconds to 10 seconds. For an Audio Fusion client, the time for advertising has decreased from 4 seconds down to 0 seconds. The time for scanning has remained the same at 5 seconds. The sleep time for an Audio Fusion client has increased from 0 seconds to 7 seconds.

Figure 6:
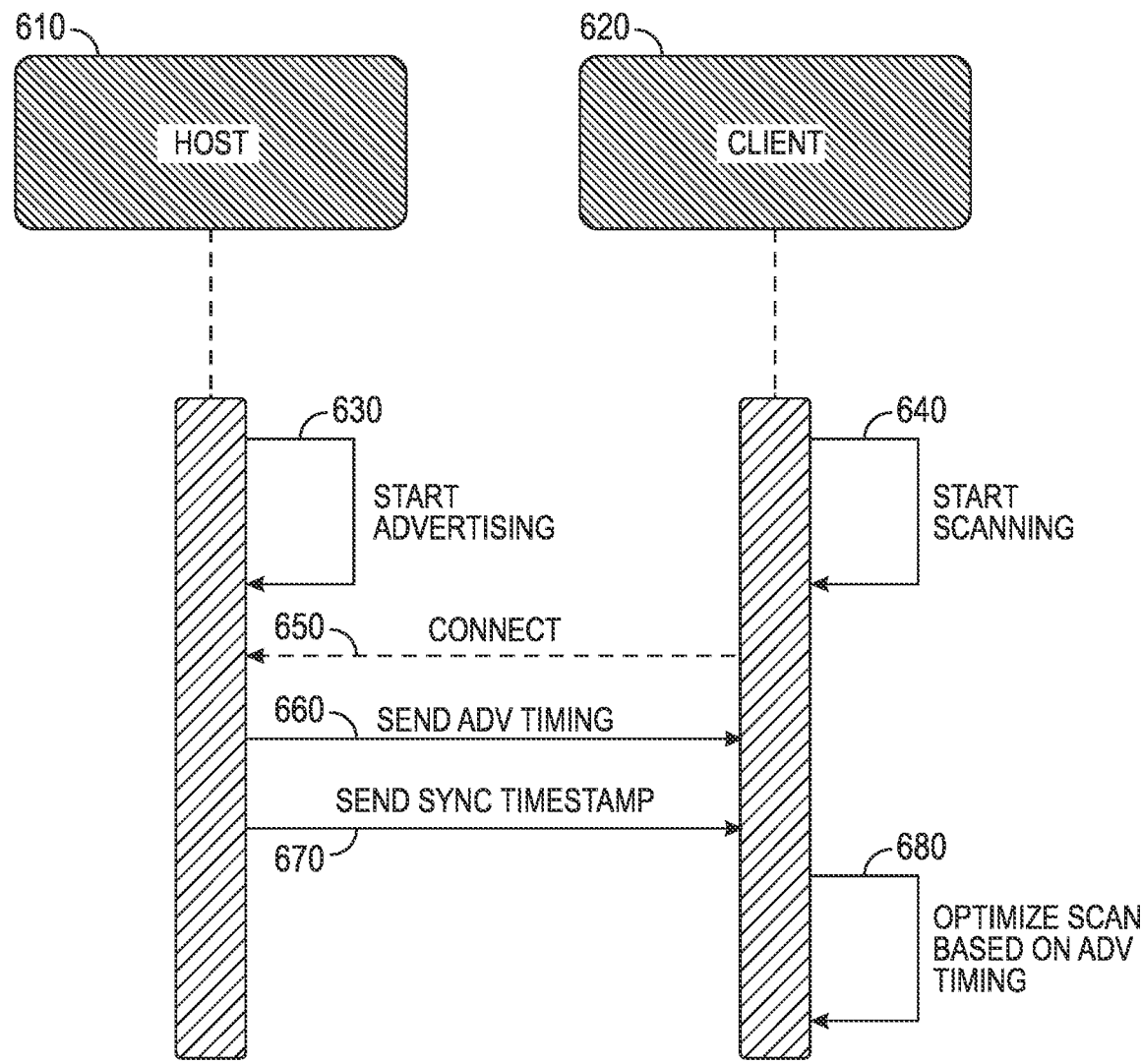
FIG. 6 illustrates an example sequence diagram of additional embodiments of an adaptive scheduler for collaboration networking, according to some embodiments.

FIG. 6 illustrates an example sequence diagram of additional embodiments of an adaptive scheduler for collaboration networking, according to some embodiments. In some embodiments, FIG. 6 may be instantiated, at least in part, through the execution of program instructions stored in system memory 103 and executed by host processor(s) 101 of IHS 100. FIG. 6 depicts that the client scan rate can be provided by the host upon connection (or at any time that the host changes its advertisement rate due to environmental changes). The timing can also be synchronized using the host's timestamp to further lower the scan time.

FIG. 6 begins with the host 610 starting to advertise 630 while the client 620 starts to scan 640. A Wi-Fi Direct connection 650 is then established. At 660, the host 610 sends advertising timing 660 to the client 620, which allows the client 620 to determine a client scan rate. This can also be provided any time that the host 610 changes its advertisement rate due to environmental changes. The host 610 then sends a synchronization timestamp 670 to the client 620, so that the timing of the host and client can be synchronized in order to further lower the scan time. At 680, the client 620 optimizes its scan rate and/or scan timing based on the received advertising timing, so that the client scans as the host is advertising.

FIG. 7A is a chart depicting test results of an advertisement rate, scan rate, and sleep duration for an example default adaptive scan configuration, no adaptive scanning, and an example optimized adaptive scan configuration, according to some embodiments. The default adaptive scan configuration is similar to the configuration of FIG. 4, except that in this default configuration some sleep time is added for both the host and the client. The off configuration occurs when no advertising or scanning occurs. The optimized adaptive scan configuration is similar to the configuration of FIG. 5.

As shown in FIG. 7A, the host advertises for 11 seconds, scans for 5 seconds, and sleeps for 1 second in the default adaptive scan configuration. The client advertises for 4 seconds, scans for 5 seconds, and sleeps for 3 seconds in the default adaptive scan configuration. In the off adaptive scan configuration, neither the host nor the client performs any advertising or scanning. Instead, the host sleeps for 17 seconds, and the client sleeps for 12 seconds. In the optimized adaptive scan configuration, the host advertises for 7 seconds, and then sleeps for 10 seconds, while performing no scanning. The client scans for 5 seconds and sleeps for 7 seconds, while performing no advertising, in the optimized adaptive scan configuration.

Figure 7B:
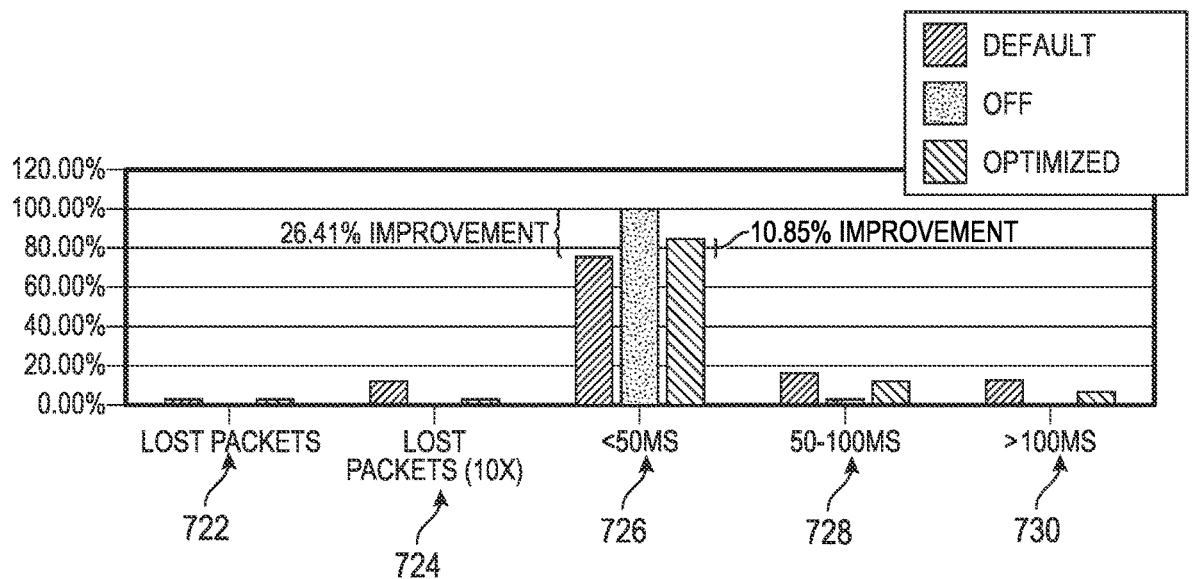
FIG. 7B depicts two charts illustrating the percentage of packets within certain categories of packet latency, for a default adaptive scan configuration, no adaptive scanning, and an optimized adaptive scan configuration, according to some embodiments.
Figure 7B:
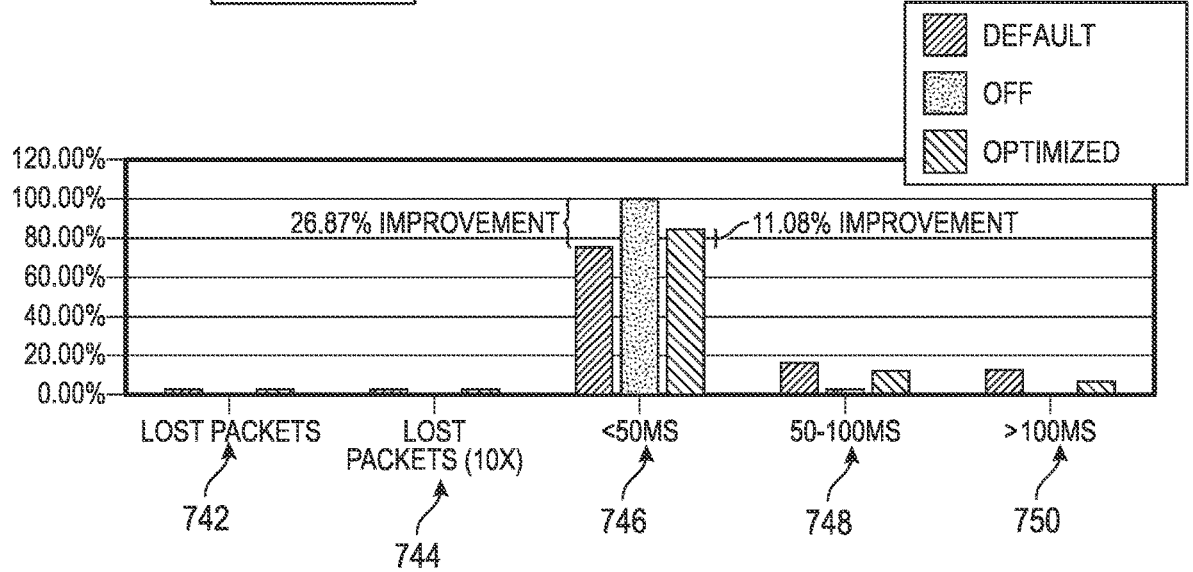

FIG. 7B depicts two test result charts illustrating the percentage of packets within certain categories of packet latency, for a default adaptive scan configuration, no adaptive scanning, and an optimized adaptive scan configuration, according to some embodiments. The tests were run on a laptop with Windows 10 installed, and an Intel® AX210/AX211 Wi-Fi 6 component. The top chart depicts the average packet latency across all clients when a host is receiving bidirectional traffic. The bottom chart depicts the average packet latency across all clients when a host is sending bidirectional traffic. Each chart shows the percentage of packets in the different categories of patent latency for the 3 types of adaptive scan configurations: (a) default adaptive scan configuration; (b) no scanning; and (c) an optimized adaptive scan configuration.

For example, the two charts depict the percentage of packets lost (722, 742) for the default adaptive scan configuration, no scanning, and the optimized adaptive scan configuration. The charts further depict the percentage of lost packets after 10 retries (724, 744) for the default adaptive scan configuration, no scanning, and the optimized adaptive scan configuration. The charts further depict the percentage of packets with a packet latency of less than 50 ms (726, 746) for the default adaptive scan configuration, no scanning, and the optimized adaptive scan configuration. The charts further depict the percentage of packets with a packet latency between 50 ms and 100 ms (728, 748) for the default adaptive scan configuration, no scanning, and the optimized adaptive scan configuration. The charts further depict the percentage of packets with a packet latency greater than 100 ms (730, 750) for the default adaptive scan configuration, no scanning, and the optimized adaptive scan configuration.

FIG. 7B shows that with no scanning or advertising occurring, then greater than 99% of the packets are delivered with under 50 ms of packet latency, providing an effective means to control packet latency. With the host receiving bidirectional traffic (top graph), the off configuration provided a 26.41% improvement over the default adaptive scan configuration. With the host sending bidirectional traffic (bottom graph), the off configuration provided a 26.87% improvement over the default adaptive scan configuration. FIG. 7B also shows that the optimized adaptive scan configuration provided greater than 10% improvement in the number of packets with a packet latency of under 50 ms, as compared with the default adaptive scan configuration. With the host receiving bidirectional traffic (top graph), the optimized configuration provided a 10.85% improvement over the default adaptive scan configuration. With the host sending bidirectional traffic (bottom graph), the off configuration provided a 11.08% improvement over the default adaptive scan configuration.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises", "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A first Information Handling System (IHS), comprising:
   a processor; and
   a memory coupled to the processor, wherein the memory comprises program instructions store thereon that, upon execution by the processor, cause the first IHS to:
      establish a peer-to-peer (P2P) connection with a second IHS;
      adapt a scan rate and an advertisement rate of the first IHS based, at least in part, on context of the P2P connection;
      determine that the first IHS is configured as a client for the P2P connection;
      adapt a scan rate of the first IHS; and
      stop any advertisements by the first IHS for other P2P connections.

2. The IHS of claim 1, wherein the context of the P2P connection comprises throughput needs of an application that communicates via the P2P connection.

3. The IHS of claim 1, wherein the context of the P2P connection comprises one or more environmental conditions.

4. The IHS of claim 3, wherein the one or more environmental conditions comprise an overall available time for communication between the first IHS and the second IHS via the P2P connection.

5. The IHS of claim 3, wherein the one or more environmental conditions comprise a channel bandwidth of the P2P connection.

6. The IHS of claim 3, wherein the one or more environmental conditions comprise an amount of resources allocated to either the first IHS or the second IHS by parameters of the P2P connection.

7. The IHS of claim 1, wherein the P2P connection comprises a Wi-Fi Direct connection.

8. The IHS of claim 1, wherein to adapt the scan rate and the advertisement rate of the first IHS, the program instructions, upon execution by the processor, further cause the first IHS to:
   determine that the first IHS is configured as a host for the P2P connection;
   adapt an advertisement rate of the first IHS; and
   stop any scans by the first IHS for other P2P connections.

9. The IHS of claim 1, wherein the P2P connection is established via a wireless communication medium, and wherein the program instructions, upon execution by the processor, further cause the first IHS to:
   determine a channel utilization of the wireless communication medium; and
   select a channel of the wireless communication medium based, at least in part, on the determined channel utilization.

10. The IHS of claim 1, wherein the first IHS is configured as a host for the P2P connection, and wherein the program instructions, upon execution by the processor, further cause the first IHS to:

provide a client scan rate to the second IHS.

11. The IHS of claim 10, wherein the program instructions, upon execution by the processor, further cause the first IHS to:

provide a synchronization timestamp to the second IHS.

12. The IHS of claim 1, wherein the program instructions, upon execution by the processor, further cause the first IHS to:

determine that a number of P2P connected devices has reached a threshold; and based at least in part on the determination, stop any scans and advertisements.

13. One or more non-transitory computer-readable storage media storing program instructions, that when executed on or across one or more processors of a first Information Handling System (IHS), cause the first IHS to:

establish a peer-to-peer (P2P) connection with a second IHS;

adapt a scan rate and an advertisement rate of the first IHS based, at least in part, on context of the P2P connection;

determine that the first IHS is configured as a client for the P2P connection;

adapt a scan rate of the first IHS; and stop any advertisements by the first IHS for other P2P connections.

14. The one or more non-transitory computer-readable storage media of claim 13, wherein to adapt the scan rate and the advertisement rate of the first IHS, the program instructions further cause the first IHS to:

determine that the first IHS is configured as a host for the P2P connection;

adapt an advertisement rate of the first IHS; and stop any scans by the first IHS for other P2P connections.

15. The one or more non-transitory computer-readable storage media of claim 13, wherein the P2P connection is established via a wireless communication medium, and wherein the program instructions further cause the first IHS to:

determine a channel utilization of the wireless communication medium; and select a channel of the wireless communication medium based, at least in part, on the determined channel utilization.

16. The one or more non-transitory computer-readable storage media of claim 10, wherein the program instructions further cause the first IHS to:

determine that a number of P2P connected devices has reached a threshold; and based at least in part on the determination, stop any scans and advertisements.

17. A method comprising:

establishing, by a first Information Handling System (IHS), a peer-to-peer (P2P) connection with a second IHS, wherein the first IHS is configured as a host of the P2P connection; and adapting a scan rate and an advertisement rate of the first IHS based, at least in part, on context of the P2P connection, wherein adapting the scan rate and the advertisement rate of the first IHS further comprises:

adapting an advertisement rate of the P2P connection for the first IHS; and stopping any scans by the first IHS for other P2P connections.

18. A method comprising:

establishing, by a first Information Handling System (IHS), a peer-to-peer (P2P) connection with a second IHS, wherein the first IHS is configured as a host of the P2P connection;

adapting a scan rate and an advertisement rate of the first IHS based, at least in part, on context of the P2P connection;

determining that a number of P2P connected devices has reached a threshold; and based at least in part on the determination, stopping scanning and advertising for other P2P connections.

\* \* \* \* \*